(12) United States Patent
Kato

(10) Patent No.: US 7,395,743 B2
(45) Date of Patent: Jul. 8, 2008

(54) LATHE SPINDLE UNIT AND LATHE APPARATUS

(75) Inventor: Heizaburo Kato, Shizuoka (JP)

(73) Assignee: Sankyo Seisakusho Co., Tokyo (JP)

( * ) Notice: Subject to any disclaimer, the term of this patent is extended or adjusted under 35 U.S.C. 154(b) by 613 days.

(21) Appl. No.: 11/013,925

(22) Filed: Dec. 17, 2004

(65) Prior Publication Data
US 2005/0166728 A1   Aug. 4, 2005

(30) Foreign Application Priority Data
Dec. 25, 2003   (JP) ............................. 2003-429626

(51) Int. Cl.
*B23B 28/00* (2006.01)
(52) U.S. Cl. .......................................... 82/148; 82/146
(58) Field of Classification Search ................. 82/148, 82/132, 146, 147, 150, 157, 117, 121, 142
See application file for complete search history.

(56) References Cited

U.S. PATENT DOCUMENTS

| 3,481,231 | A | * | 12/1969 | Cormier | ..................... | 82/133 |
| 5,067,534 | A | * | 11/1991 | Toivio | ..................... | 144/215.2 |

2002/0138959 A1   10/2002   Kato

FOREIGN PATENT DOCUMENTS

| CN | 1205929 | A | 1/1999 |
| EP | 0507123 | A2 | 10/1992 |
| EP | 0507123 | A3 | 10/1992 |
| EP | 1201353 | A2 | 5/2002 |
| EP | 1201353 | A3 | 5/2002 |
| JP | 7-100711 | | 4/1995 |

OTHER PUBLICATIONS

European Search Report dated Jun. 7, 2005.
European Office Action mailed Feb. 8, 2006, directed to counterpart EP Application No. 04257954.0.
Chinese Office Action mailed Jun. 29, 2007, directed to CN Application No. 2004101048818, 15 pages.

* cited by examiner

*Primary Examiner*—Willmon Fridie, Jr.
(74) *Attorney, Agent, or Firm*—Morrison & Foerster LLP

(57) ABSTRACT

A lathe spindle unit is provided with: a rotatable spindle having a cam follower, and a holding section for holding a work piece; a drive source for rotatively driving the spindle; and a driven rotation shaft that has a cam and that is rotatively driven by the drive source. The driven rotation shaft rotatively drives the spindle using the cam and the cam follower.

12 Claims, 17 Drawing Sheets

LATHE SPINDLE UNIT AND LATHE APPARATUS

CROSS-REFERENCE TO RELATED APPLICATION

The present application claims priority upon Japanese Patent Application No. 2003-429626 filed on Dec. 25, 2003, which is herein incorporated by reference.

BACKGROUND OF THE INVENTION

1. Field of the Invention

The present invention relates to lathe spindle units and lathe apparatuses.

2. Description of the Related Art

Lathe apparatuses, which are typical machining tools, are already well known. A lathe apparatus has: a lathe spindle unit that is provided with a rotatable spindle having a holding section for holding a work piece, and a drive source for rotatively driving the spindle; a base for supporting the lathe spindle unit; and a tool for machining the work piece. (See, for example, JP 07-100711A.)

With such lathe apparatuses, when the spindle is rotatively driven by the drive force of the drive source, the work piece that is held by the holding section of the spindle is rotated, and the rotating work piece is cut and machined by the tool.

The lathe spindle unit described above generally has a mechanism for transmitting the drive force of the drive source to the spindle through gears or the like. However, lathe spindle units having such a mechanism have, for example, the following problems. That is, there is a possibility that a desired machining precision cannot be obtained due to backlash that occurs in the gears, for example. There is also the problem that the spindle becomes long in its rotation-axis direction due to a pulley being provided at the end, in the rotation-axis direction, of the spindle, resulting in the unit becoming large.

SUMMARY OF THE INVENTION

The present invention was arrived in light of the foregoing problems, and it is an object thereof to achieve a lathe spindle unit and a lathe apparatus having a novel and appropriate mechanism for transmitting the drive force of the drive source to a spindle.

A main aspect of the present invention is a lathe spindle unit provided with: a rotatable spindle having a cam follower, and a holding section for holding a work piece; a drive source for rotatively driving the spindle; and a driven rotation shaft that has a cam and that is rotatively driven by the drive source, the driven rotation shaft rotatively driving the spindle using the cam and the cam follower.

Other features of the present invention will become clear through the accompanying drawings and the following description.

DETAILED DESCRIPTION OF THE INVENTION

Figure 1:
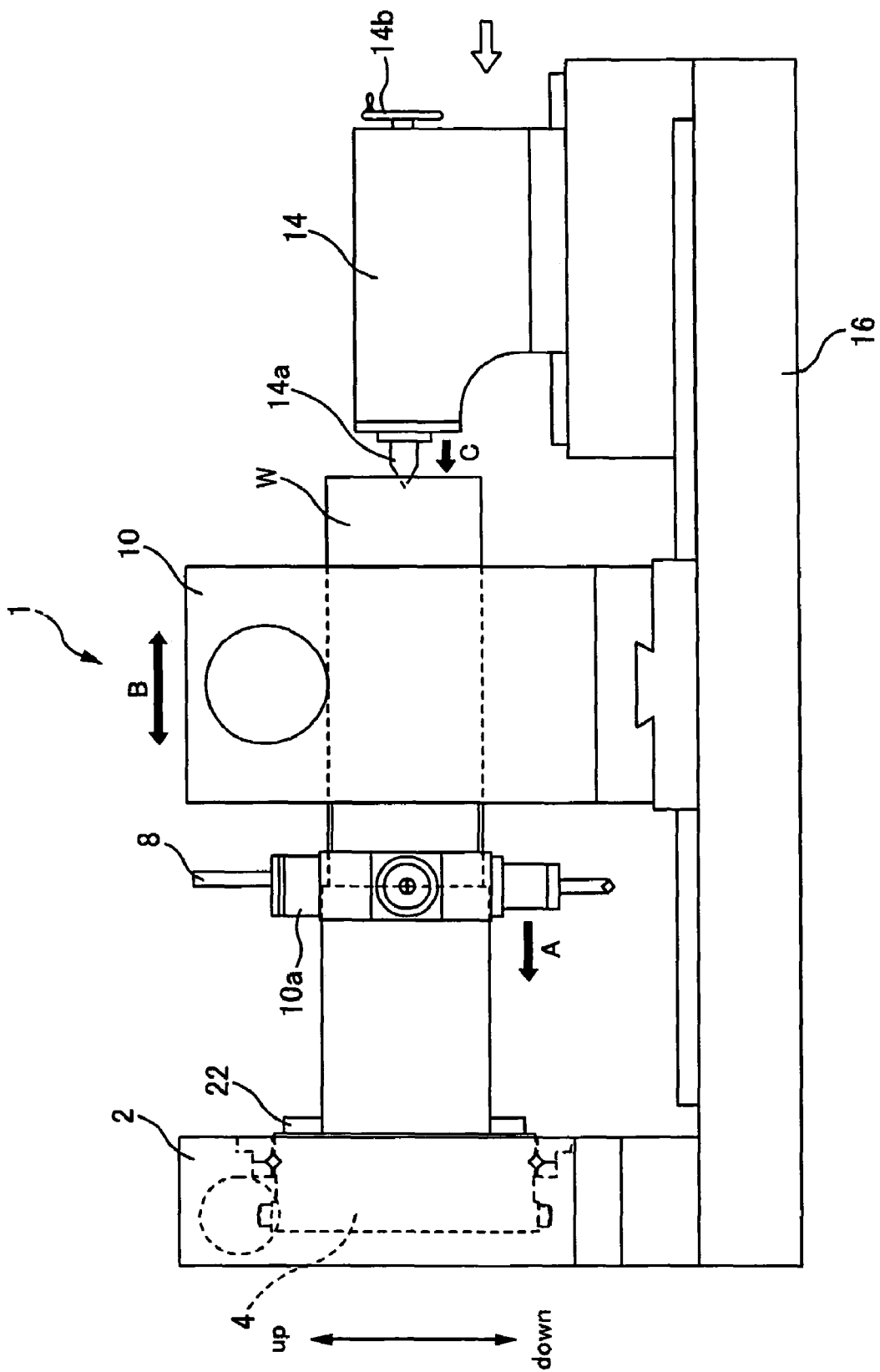
FIG. 1 is a schematic structural diagram of the lathe apparatus 1 according to an embodiment thereof.

At least the following matters will become clear by the explanation in the present specification and the description of the accompanying drawings.

A lathe spindle unit is provided with: a rotatable spindle having a cam follower, and a holding section for holding a work piece; a drive source for rotatively driving the spindle; and a driven rotation shaft that has a cam and that is rotatively driven by the drive source, the driven rotation shaft rotatively driving the spindle using the cam and the cam follower.

In this way, it is possible to achieve a lathe spindle unit having a novel and appropriate mechanism for transmitting the drive force of a drive source to a spindle.

Further, in the above-described lathe spindle unit, the cam may be a globoidal cam.

In this way, it is possible to achieve a compact lathe spindle unit with which the machining precision can be increased.

Further, the lathe spindle unit may be provided with a supporting section for rotatably supporting the spindle; a first V-shaped groove may be formed directly in the spindle along the rotation direction of the spindle, and the supporting section may have a second V-shaped groove that is in opposition to the first V-shaped groove; and a cross roller bearing may be made by interposing, between the spindle and the supporting section, a plurality of rolling elements that roll while being in contact with the first V-shaped groove and the second V-shaped groove, and making the axis of rolling of adjacent rolling elements be perpendicular to one another.

In this way, it is possible to achieve a lathe spindle unit with which the machining precision can be increased.

Further, in the above-described lathe spindle unit, the holding section may be provided at a front end and at a rear end of the spindle in the rotation-axis direction thereof.

In this way, it is possible to achieve a lathe spindle unit with which the work piece can be processed efficiently.

Further, in the above-described lathe spindle unit, the spindle may have a hollow section in the rotation-axis direction of the spindle.

With this lathe spindle unit, it is possible to keep the tool from coming into contact with the spindle.

Further, a lathe apparatus is provided with: a lathe spindle unit provided with a rotatable spindle having a cam follower, and a holding section for holding a work piece, a drive source for rotatively driving the spindle, and a driven rotation shaft that has a cam and that is rotatively driven by the drive source, the driven rotation shaft rotatively driving the spindle using the cam and the cam follower; a base for supporting the lathe spindle unit; and a tool for machining the work piece.

In this way, it is possible to achieve a lathe apparatus provided with a lathe spindle unit having a novel and appropriate mechanism for transmitting the drive force of a drive source to a spindle.

Further, in the above-described lathe apparatus, the cam may be a globoidal cam.

In this way, it is possible to achieve a lathe apparatus provided with a compact lathe spindle unit with which the machining precision can be increased.

Further, in the above-described lathe apparatus, the lathe spindle unit may be provided with a supporting section for rotatably supporting the spindle; a first V-shaped groove may be formed directly in the spindle along the rotation direction of the spindle, and the supporting section may have a second V-shaped groove that is in opposition to the first V-shaped groove; and a cross roller bearing may be made by interposing, between the spindle and the supporting section, a plurality of rolling elements that roll while being in contact with the first V-shaped groove and the second V-shaped groove, and making the axis of rolling of adjacent rolling elements be perpendicular to one another.

In this way, it is possible to achieve a lathe apparatus with which the machining precision can be increased.

Further, in the above-described lathe apparatus, the holding section may be provided at a front end and at a rear end of the spindle in the rotation-axis direction thereof.

In this way, it is possible to achieve a lathe apparatus with which the work piece can be processed efficiently.

Further, in the above-described lathe apparatus, the spindle may have a hollow section in the rotation-axis direction of the spindle.

With this lathe apparatus, it is possible to keep the tool from coming into contact with the spindle.

Further, in the above-described lathe apparatus, the tool may be passed through the hollow section, and the work piece being held by the holding section may be machined by that tool.

With this lathe apparatus, the flexibility in how work pieces are processed can be increased.

Further, in the above-described lathe apparatus, the work piece may be held by the holding section in a manner in which the work piece passes through the hollow section, and that work piece may be machined by the tool.

With this lathe apparatus, it is possible to achieve suitable work-piece machining even for long work pieces. Also, both the portion of the work piece that is held by the holding section and the portion of the work piece that is inside the hollow section can be machined.

Further, in the above-described lathe apparatus, the lathe spindle unit may be capable of moving in a direction along the rotation-axis direction of the spindle.

With this lathe apparatus, both the portion of the work piece that is held by the holding section and the portion of the work piece that is inside the hollow section can be machined.

Also, it is possible to lower the possibility that the problem of the machining precision deteriorating due to deteriorated concentricity etc. will occur, thereby allowing high machining precision to be achieved.

Further, in the above-described lathe apparatus, the base may turnably support the lathe spindle unit.

With this lathe apparatus, the flexibility in how work pieces are processed can be increased.

Example Configuration of the Lathe Apparatus

Figure 2:
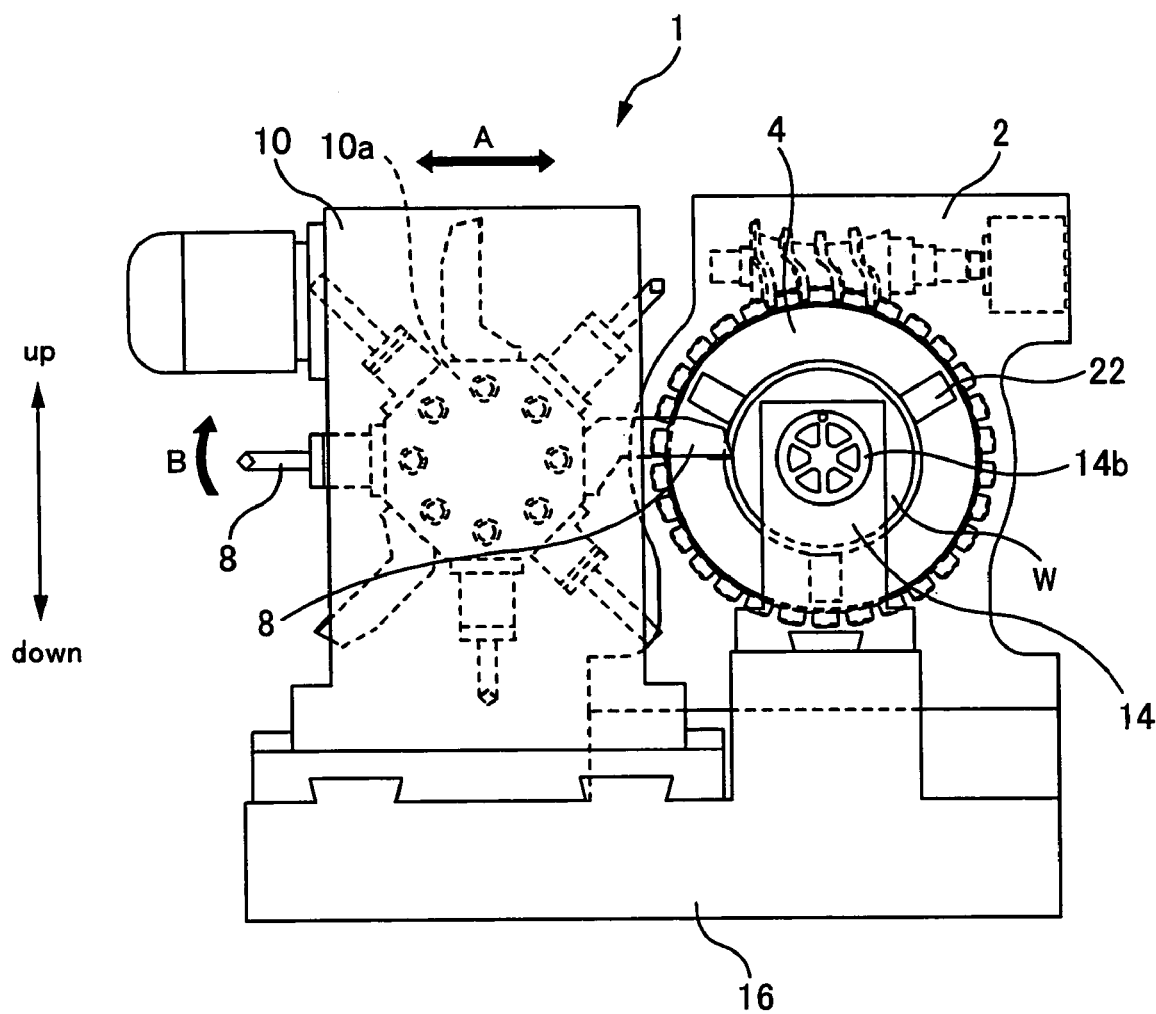
FIG. 2 is a schematic structural diagram of the lathe apparatus 1 shown in FIG. 1 viewed from the direction of the white arrow in FIG. 1.

An example of a configuration of a lathe apparatus 1 is described below using FIG. 1 and FIG. 2. FIG. 1 schematically shows the configuration of the lathe apparatus 1 according to the present embodiment. FIG. 2 is a schematic structural diagram of the lathe apparatus 1 shown in FIG. 1 viewed from the direction of the white arrow in FIG. 1. It should be noted that the arrows in FIG. 1 and FIG. 2 indicate the vertical direction. For example, a tailstock 14 is disposed on an upper portion of a base 16.

The lathe apparatus 1 is provided with, for example, a lathe spindle unit 2 having a spindle 4, a tool 8 for machining a work piece W, a tool support 10, the tailstock 14, and the base 16.

The lathe spindle unit 2 is a unit that is provided with the spindle 4, which is capable of rotation. The spindle 4 is provided with a chuck 22, which is an example of a holding section for holding the work piece W. When the spindle 4 is rotated, the work piece W held by the chuck 22 is rotated in conjunction therewith. The structure etc. of the lathe spindle unit 2 is described in greater detail later.

The tool 8 is supported by the tool support 10, which is described later, and its function is for cutting and machining the work piece W. The work piece W is cut and machined by feeding the tool 8 in the direction, for example, along the rotation-axis direction of the spindle 4 (the direction shown by the letter A in FIG. 1) in state where the tool 8 is in contact with a suitable position of the work piece W and the work piece W is being rotated.

The function of the tool support 10 is to support the tool(s) 8. The tool support 10 is structured such that it can be moved in the direction along the rotation-axis direction of the spindle 4 (the direction indicated by the letter B in FIG. 1), and in the direction perpendicular to this direction (the direction indicted by the letter A in FIG. 2), with respect to the base 16, which is described later. By moving the tool support 10 in the above directions, the tool 8 that is supported on the tool support 10 is brought into contact with a suitable position of the work piece W and is fed for the purpose of machining the work piece W.

The tool support 10 has a rotating section 10a, to and from which a plurality of different tools 8 can be attached and detached. When there are a plurality of different tools 8 mounted to the rotating section 10a, then by rotating the rotating section 10a (the letter B in FIG. 2 indicates an example of the rotating direction), it is possible to select a desired tool 8 for cutting the work piece W from among the plurality of different tools 8.

The tailstock 14 has the function of preventing off-centering from occurring when machining a long work piece W such as a bar. The tailstock 14 is provided with a center 14a and handle 14b for moving the center 14a in a direction along the rotation-axis direction of the spindle 4 (the direction indicated by the letter C in FIG. 1), and by operating the handle 14b, the center 14a is moved in the above-mentioned direction and the front end of the center 14a is inserted into a center hole provided in advance in the central portion of the work piece W. As a result, the end of the work piece W that is on the side opposite from the side that is held by the chuck 22 gets held by the center 14*a*. Then, when the work piece W is rotated, the center 14*a* rotates in cooperation with the rotation of the work piece W and prevents the occurrence of off-centering during machining of the work piece W. It should be noted that off-centering becomes noticeable with long work pieces W, and thus for short work pieces W, it is not absolutely necessary that the work piece W be supported by the center 14*a* of the tailstock 14.

The base 16 is a base for supporting the lathe spindle unit 2 described above. The base 16 also supports the tool support 10 and the tailstock 14.

The operation of the lathe apparatus 1 having this configuration is described below.

First, the work piece W is set in the lathe apparatus 1. That is, the work piece W is held by the chuck 22, and if the work piece W is long, then the handle 14*b* of the tailstock 14 is operated to insert the front end of the center 14*a* into the center hole that has been provided in advance in the central portion of the work piece W.

In this state, when the spindle 4 is rotated, the work piece W being held by the chuck 22 is rotated together with this rotation. Also, if the work piece W is being held by the center 14*a*, then the center 14*a* is also rotated in cooperation with the rotation of the work piece W.

Then, the rotating section 10*a* of the tool support 10 is rotated to select a desired tool 8 for cutting the work piece W from among the plurality of different tools 8, and the tool 8 that has been selected is brought into contact with a suitable spot on the work piece W due to movement action of the tool support 10. While the work piece W is being rotated, the tool 8 that is abutting against the work piece W is fed due to the movement action of the tool support 10, thereby cutting and machining the work piece W.

Example Configuration of the Lathe Spindle Unit

Figure 3:
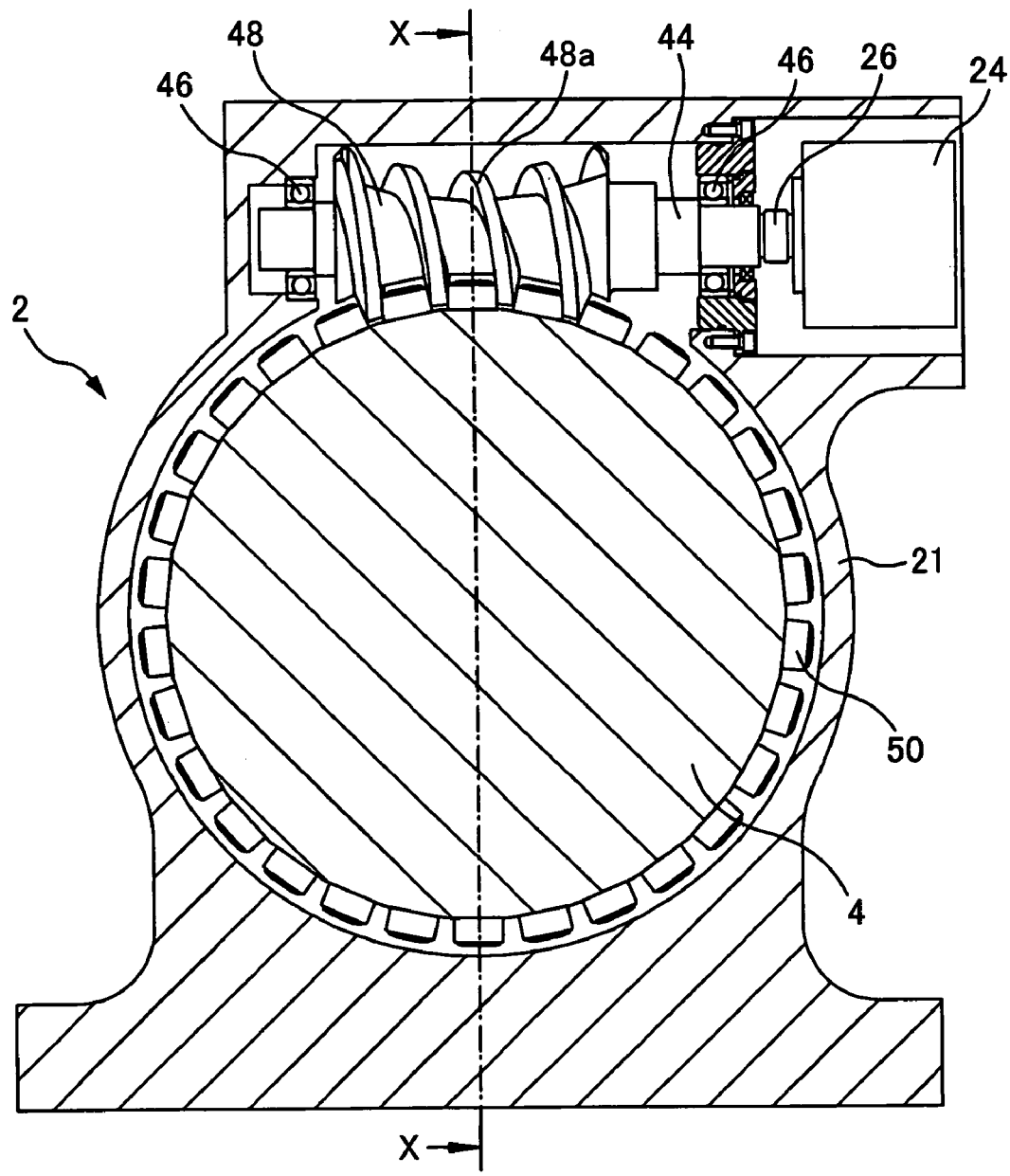
FIG. 3 is a diagram showing the internal structure of the lathe spindle unit 2 according to the present embodiment.
Figure 4:
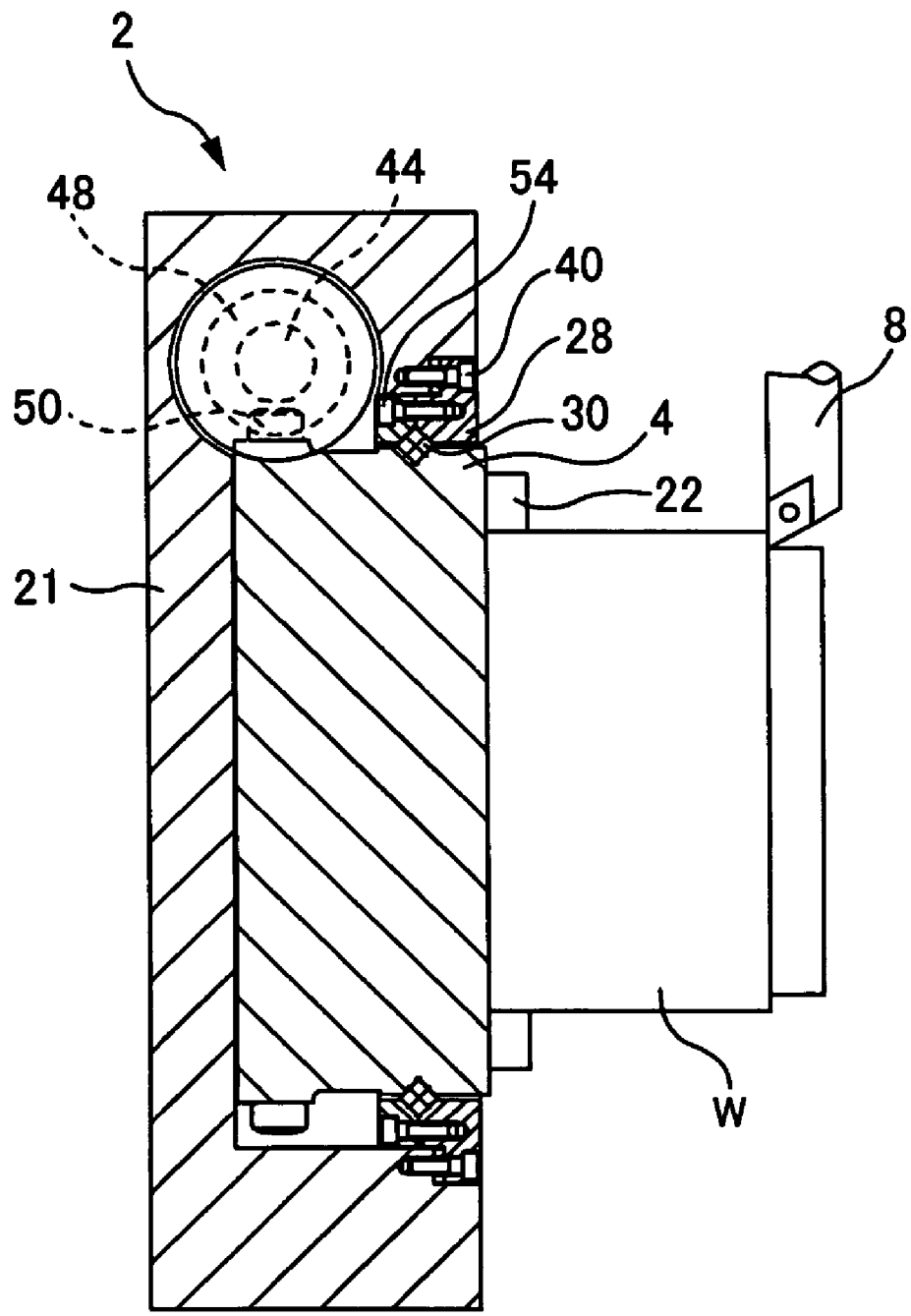
FIG. 4 is a cross-section taken along the line X-X of FIG. 3.

An example of the configuration of the lathe spindle unit 2 is described next using FIG. 3 and FIG. 4. FIG. 3 is a diagram of the internal structure of the lathe spindle unit 2 according to the present embodiment. FIG. 4 is a section taken along the line X-X in FIG. 3.

The lathe spindle unit 2 is, for example, provided with a motor 24 which serves as an example of a drive source for rotatively driving the spindle 4, a driven shaft 44 that is rotatively driven by the motor 24, the spindle 4 which is rotatively driven by the driven shaft 44, and a supporting section 28 for rotatively supporting the spindle 4.

The driven shaft 44 is supported by a pair of ball bearings 46 in such a manner that it can rotate with respect to a housing 21. The driven shaft 44 is linked, at one end side in its axial direction, to the motor 24 via a link member 26, and the driven shaft 44 is rotatively driven due to the drive force of the motor 24. The driven shaft 44 is provided with a cam. This cam has a cam surface 48*a* whose phase is displaced in the axial direction by rotating the driven shaft 44. Here, a globoidal cam 48, which is free of backlash not only when stopped but during indexing as well, is used as the cam.

The spindle 4 is supported by a cross roller bearing 30 in such a manner that it can rotate with respect to the supporting section 28. As mentioned above, the spindle 4 is provided with a chuck 22 for holding the work piece W, and when the spindle 4 is rotated, the work piece W that is held by the chuck 22 is rotated along therewith. A plurality of cam followers 50 disposed at an equal spacing in the circumferential direction are provided on the outer circumferential surface, on the side opposite from the side on which the chuck 22 is provided, of the spindle 4. The cam followers 50 mesh with the cam surface 48*a* of the globoidal cam 48 mentioned above, thereby transmitting the rotative force of the driven shaft 44 to the spindle 4 via the globoidal cam 48 and the cam followers 50. In other words, the spindle 4 is rotatively driven by the driven shaft 44 using the globoidal cam 48 and the cam followers 50. It should be noted that the configuration etc. of the cross roller bearing 30 is described in greater detail later.

The supporting section 28 rotatively supports the spindle 4 via the cross roller bearing 30. The supporting section 28 is disposed separated from the outer circumferential surface of the spindle 4 with a very small spacing therebetween, and is fastened to the housing 21 by bolts 40.

The operation of the lathe spindle unit 2 having this configuration is described below.

When the driven shaft 44 is driven by the motor 24, the driven shaft 44 rotates with respect to the housing 21. When the driven shaft 44 is rotated, the globoidal cam 48 also rotates, and the cam followers 50 meshing with the globoidal cam 48 successively engage with the cam surface 48*a*, thereby transmitting the rotative drive force to the spindle 4 and causing the spindle 4 to rotate about the rotation axis of the spindle 4. When the spindle 4 is rotated, the work piece W that is held by the chuck 22 is rotated along with the spindle 4.

Example Configuration of the Cross Roller Bearing

Figure 5:
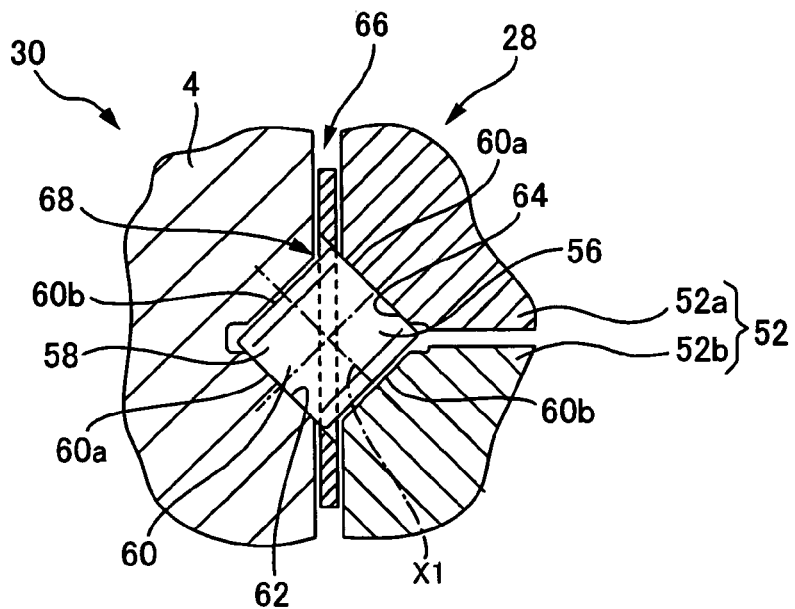
FIG. 5 is a magnified view of the cross roller bearing 30 shown in FIG. 4.
Figure 6:
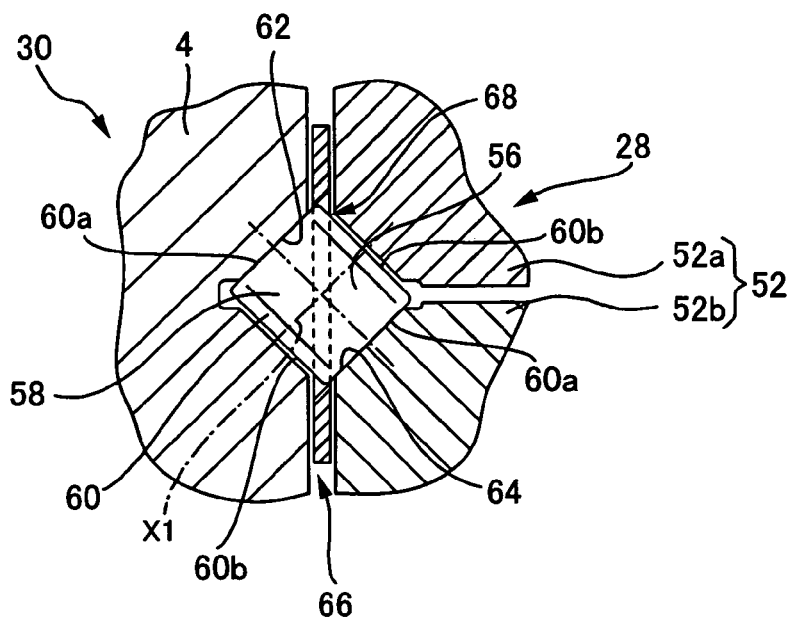
FIG. 6 is a diagram showing a rolling element 60 adjacent to the rolling element 60 shown in FIG. 5.

An example of the configuration of the cross roller bearing 30 is described next using FIG. 4 to FIG. 6. FIG. 5 is a magnified view of the cross roller bearing 30 shown in FIG. 4. FIG. 6 is a diagram showing a rolling element 60 that is adjacent to the rolling element 60 shown in FIG. 5.

The supporting section 28 described above has two annular members 52*a* and 52*b*, and with these members forms an outer ring annular body 52. The edge portions on the spindle 4 side of the annular members 52*a* and 52*b* have been chamfered to 45° over their entire circumference. The annular members 52*a* and 52*b* are arranged overlapping one another and fastened by bolts 54, leaving a very small spacing between them, and their chamfered portions form a second V-shaped groove 56 that opens on the spindle 4 side.

A first V-shaped groove 58 that opens toward the outer ring annular body 52 is formed over the entire circumference of the spindle 4 at a position that is in opposition to the second V-shaped groove 56.

A plurality of cylindrical rolling elements 60 are interposed between the first V-shaped groove 58 and the second V-shaped groove 56. Each rolling element 60 has a pair of flat end surfaces 60*b* on each end of a cylindrical rolling surface 60*a*, and the rolling elements are arranged with an equal spacing between them in the circumferential direction of the spindle 4. The rolling elements 60 are structured such that they roll while being in contact with an inner track portion 62 that forms the first V-shaped groove 58 provided in the spindle 4 on the inner side and an outer track portion 64 that forms the second V-shaped groove 56 provided in the supporting section 28 on the outer side. The rolling elements 60 are disposed with their axis of rolling x1 sloped toward the rotation axis of the spindle 4, and are disposed such that the sloping directions of the axis of rolling x1 of adjacent rolling elements 60 are perpendicular to one another as shown in FIG. 5 and FIG. 6.

It should be noted that an annular gap is provided between the spindle 4 and the outer ring annular body 52 on the supporting section 28 side, and in this gap a thin cylindrical holder 66 is provided along the gap. The rolling elements 60 are held by the holder 66. A plurality of pocket apertures 68 for individually mounting the rolling elements 60 are formed in the circumferential surface of the holder 66 in accordance with the spacing at which the rolling elements 60 are arranged.

As discussed above, the lathe apparatus 1 and the lathe spindle unit 2 of the present embodiment have a driven rotation shaft 44 that is rotatively driven by the motor 24, the driven rotation shaft 44 is provided with a cam, the spindle 4 is provided with cam followers 50, and using the cam and the cam followers 50, the spindle 4 is rotatively driven by the driven rotation shaft 44. In this way, a lathe spindle unit 2 and a lathe apparatus 1 having a novel and appropriate mechanism for transmitting the drive force of the motor 24 to the spindle 4 are achieved.

Other Embodiments

In the foregoing, a lathe spindle unit etc. according to the invention was described based on the foregoing embodiment thereof. However, the above embodiment of the invention is for the purpose of elucidating the present invention and is not to be interpreted as limiting the present invention. The invention can of course be altered and improved without departing from the gist thereof and includes equivalents.

The foregoing embodiment describes an example in which a mechanism employing a cam and the cam followers 50 is adopted as the mechanism for transmitting the drive force of the motor 24 to the spindle 4 of the lathe spindle unit 2, which is provided with a rotatable spindle 4 having the chuck 22 for holding the work piece W, and the motor 24 for rotatively driving the spindle 4.

Figure 7:
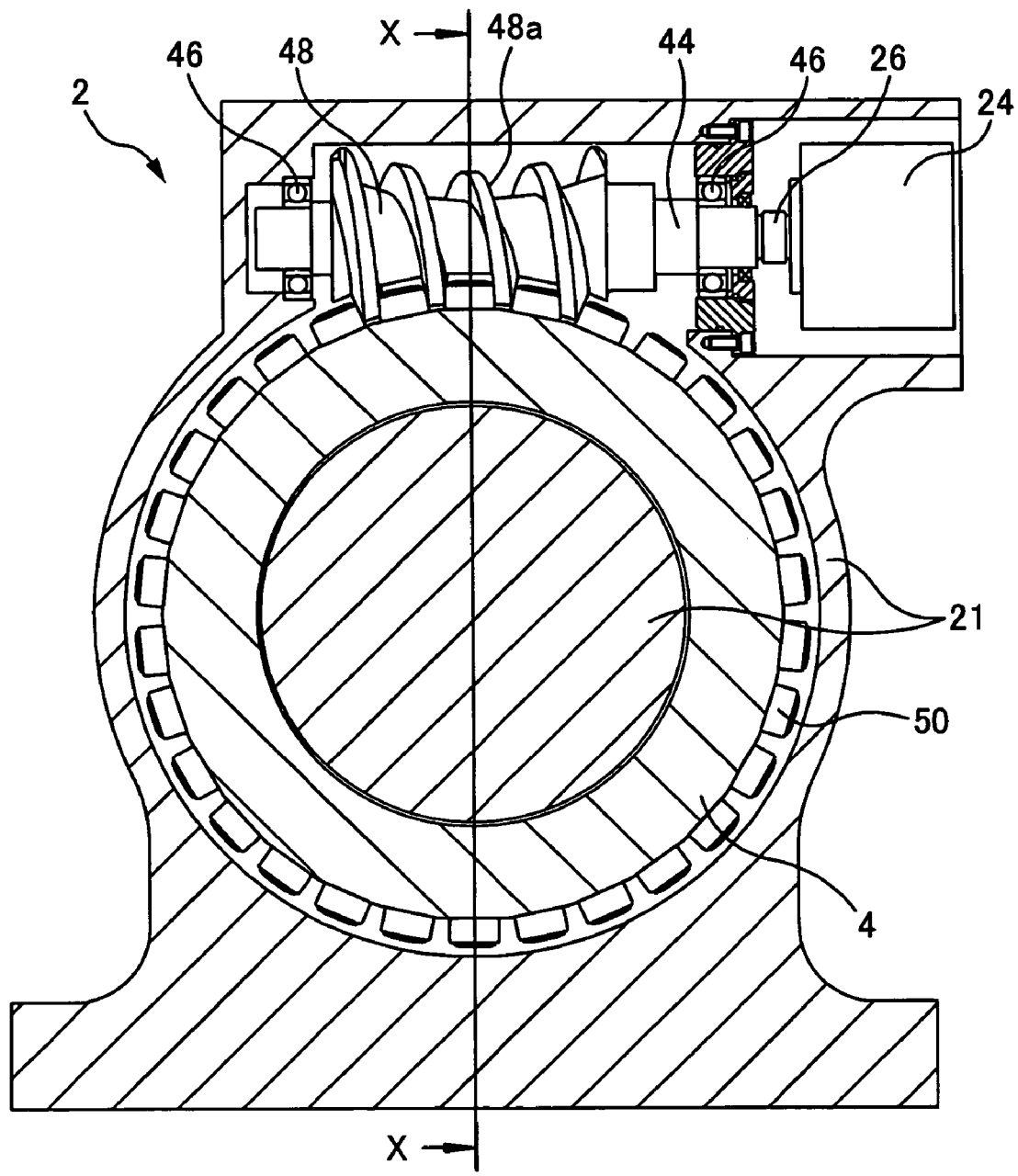
FIG. 7 is a diagram showing the lathe spindle unit 2 according to a first modified example.
Figure 8:
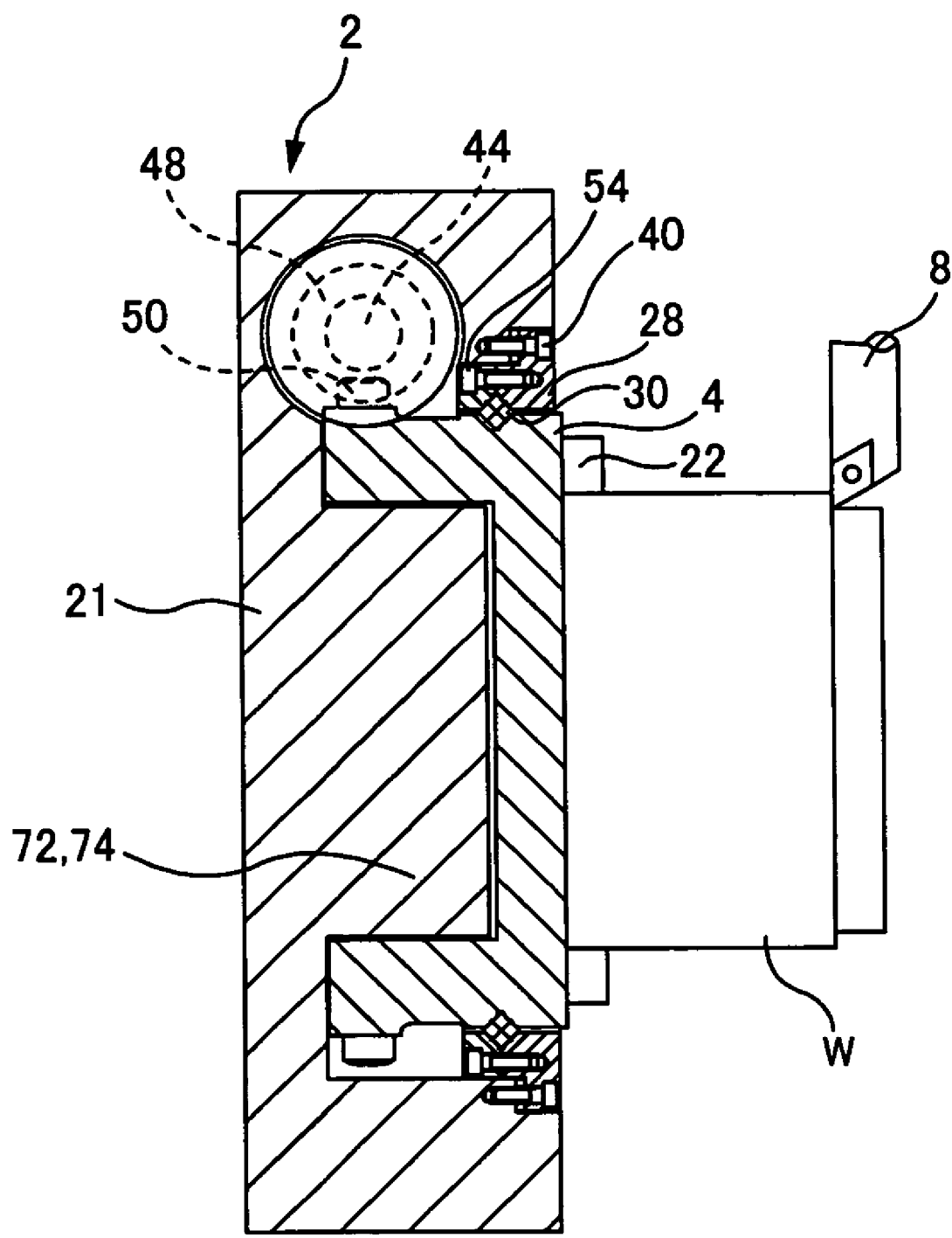
FIG. 8 is a cross-section taken along the line X-X of FIG. 7.
Figure 9:
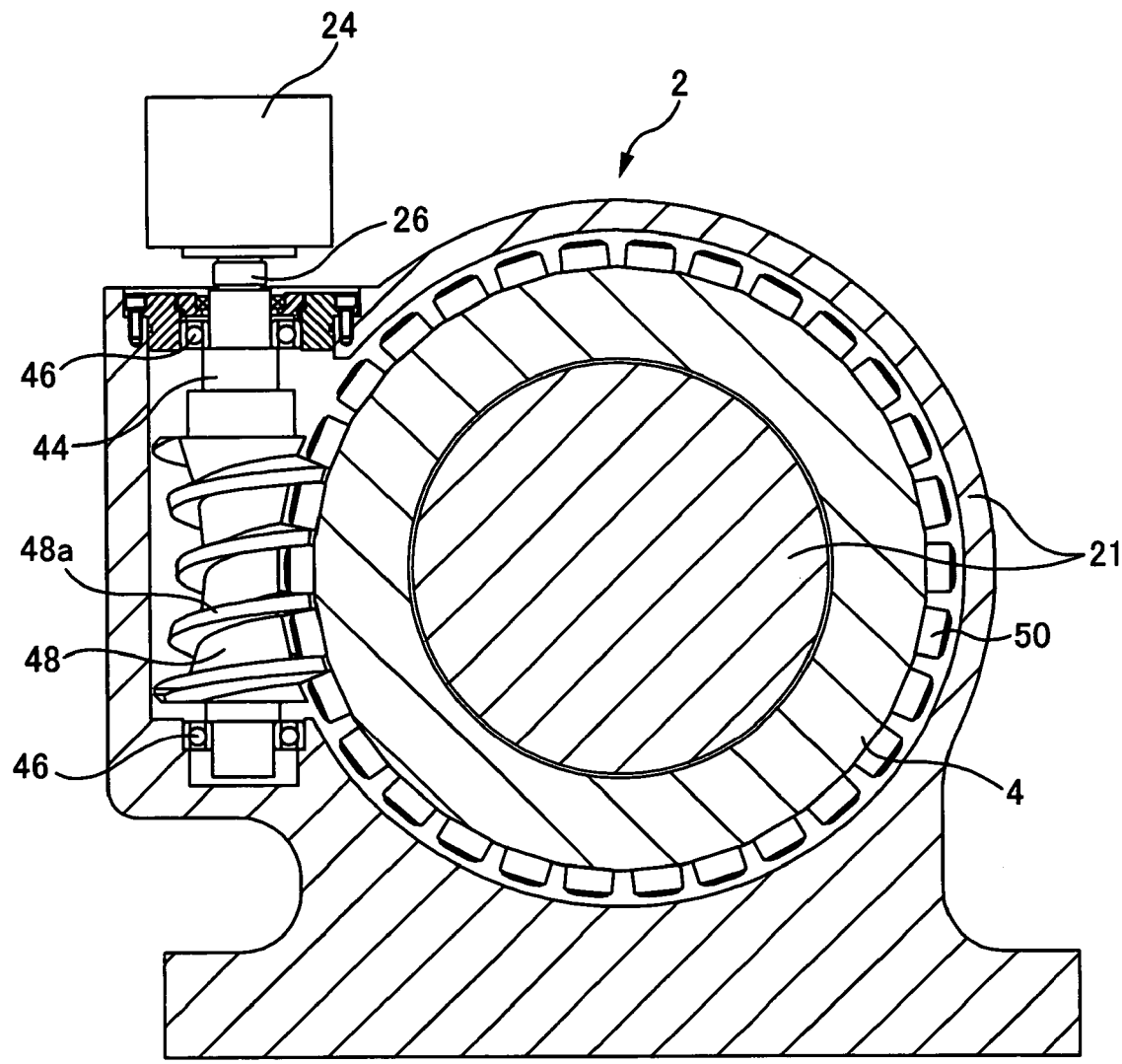
FIG. 9 is a diagram showing the lathe spindle unit 2 according to a second modified example.

Modifications of this example are described below using FIG. 7 to FIG. 9. FIG. 7 is a diagram showing the lathe spindle unit 2 according to a first modified example. FIG. 8 is a cross-section taken along the line X-X in FIG. 7. FIG. 9 is a diagram showing the lathe spindle unit 2 according to a second modified example.

First, the first modified example is described using FIG. 7 and FIG. 8. The first modified example is different from the above embodiment in that the housing 21 has a projection 72 that projects toward the spindle 4, and the spindle 4 has a recess 74 provided such that the projection 72 fits therein leaving a gap between them. The above-described mechanism using a cam and the cam followers 50 can also be adopted as the mechanism for transmitting the drive force of the motor 24 to the spindle 4 of this lathe spindle unit 2.

Next, the second modified example is described using FIG. 9. The second modified example is different from the first modified example in that the position where the cam followers 50 provided on the spindle 4 mesh with the cam surface 48a of the cam provided in the driven rotation shaft 44 is different. With the second modified example as well, the above-described mechanism using a cam and the cam followers 50 can also be adopted as the mechanism for transmitting the drive force of the motor 24 to the spindle 4. In other words, there is no restriction regarding the position where the cam followers 50 of the spindle 4 mesh with the cam surface 48a of the cam provided in the driven rotation shaft 44.

Also, in the foregoing embodiment, the cam is a globoidal cam 48, but there is no limitation to this, and it can be other cams as well.

The foregoing embodiment is more preferable, however, because the following advantages are achieved when the cam is a globoidal cam 48. That is, when the spindle 4 is rotatively driven by the driven rotation shaft 44 using the globoidal cam 48 and the cam followers 50, it is possible to eliminate the problem inherent in gears that a desired machining precision cannot be obtained due to the occurrence of backlash, for example. Also, because a configuration in which the globoidal cam 48 meshes with the plurality of cam followers 50 provided on the outer circumferential surface of the spindle 4 can be adopted, it is not necessary to provide a member such as a pulley at the ends of the spindle 4 in the rotation-axis direction thereof, and this makes it possible to make the spindle 4 shorter in its rotation-axis direction. In other words, it is possible to achieve a compact lathe spindle unit 2 with which the machining precision can be increased, and a lathe apparatus 1 having that lathe spindle unit 2.

Also, in the foregoing embodiment, the first V-shaped groove 58 is formed directly in the spindle 4 in its rotation direction, the supporting section 28 has a second V-shaped groove 56 in opposition to the first V-shaped groove 58, the plurality of rolling elements 60 that roll while being in contact with the two V-shaped grooves 56 and 58 are interposed between the spindle 4 and the supporting section 28, and the cross roller bearing 30 is made up of the rolling elements 60 by making the axis of rolling of adjacent rolling elements 60 be perpendicular to one another. However, there is no limitation to this. For example, instead of directly forming the first V-shaped groove in the spindle, it is possible to achieve the cross roller bearing by attaching to the spindle a member having the first V-shaped groove.

In a case where the cross roller bearing is achieved by attaching to the spindle a member having the first V-shaped groove, attachment error may occur when attaching that member to the spindle, for example. This attachment error may result in a drop in the precision of the bearing structure. On the other hand, with the cross roller bearing 30 according to the present embodiment, the first V-shaped groove 58 is formed directly in the spindle 4, and therefore this problem does not exist. As a result, from the standpoint that it is possible to achieve a lathe spindle unit 2 with which machining precision can be increased, and a lathe apparatus 2 having this lathe spindle unit 2, the configuration of the foregoing embodiment is preferable.

As discussed above, because it is possible to achieve a configuration in which the globoidal cam 48 meshes with the cam followers 50 provided on the outer circumferential surface of the spindle 4, the spindle 4 becomes short in the rotation-axis direction. Also, because a plurality of the cam followers 50 are provided in the outer circumferential surface of the spindle 4, the spindle 4 becomes long in the radial direction. It is possible to exploit these characteristics to achieve a lathe spindle unit, and a lathe apparatus having that lathe spindle unit, according to other embodiments that are different from the above-described embodiment (which may also be referred to below as the "first embodiment").

Figure 10:
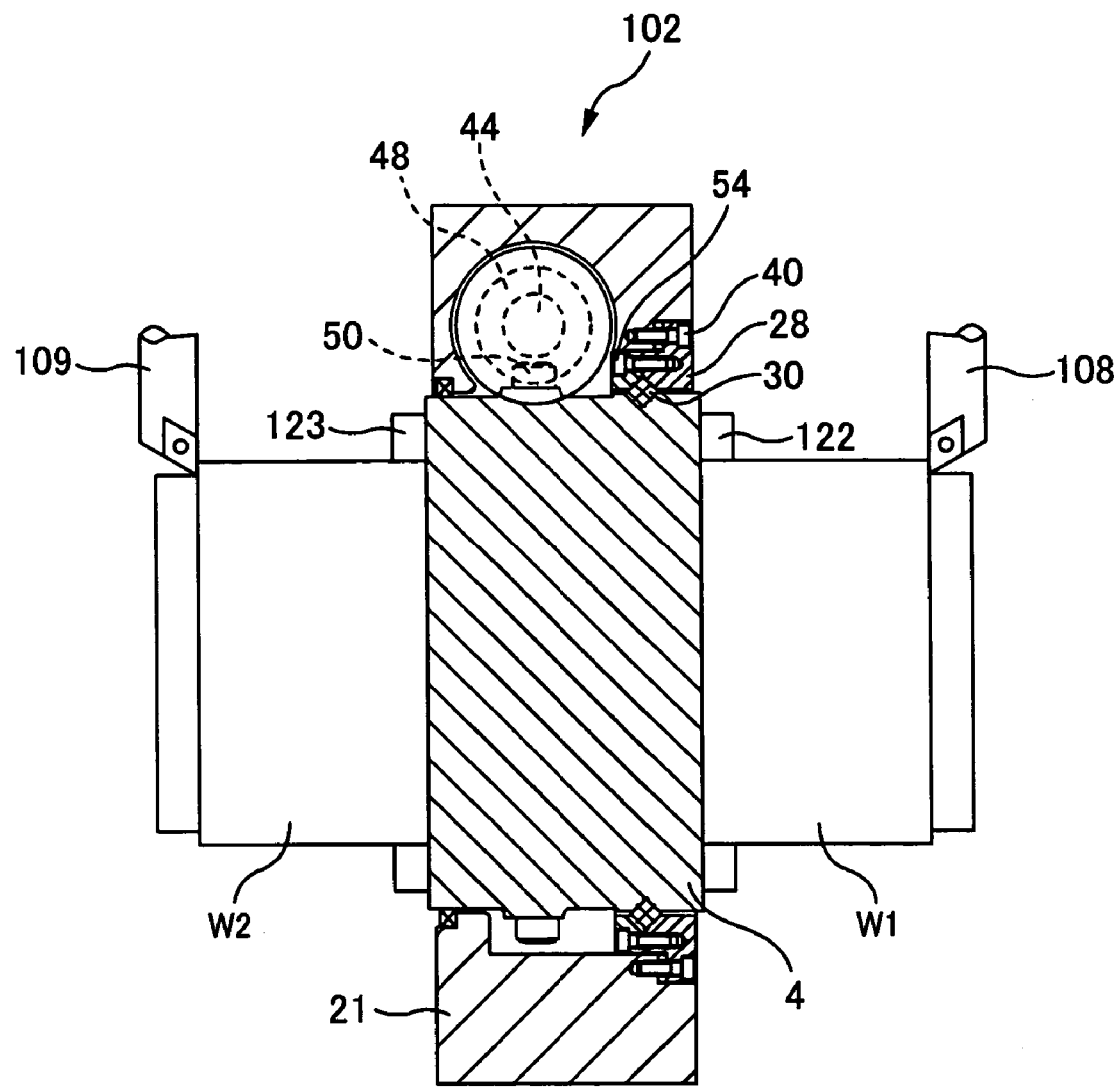
FIG. 10 is an explanatory diagram for describing a lathe spindle unit 102 etc. according to a second embodiment.
Figure 14:
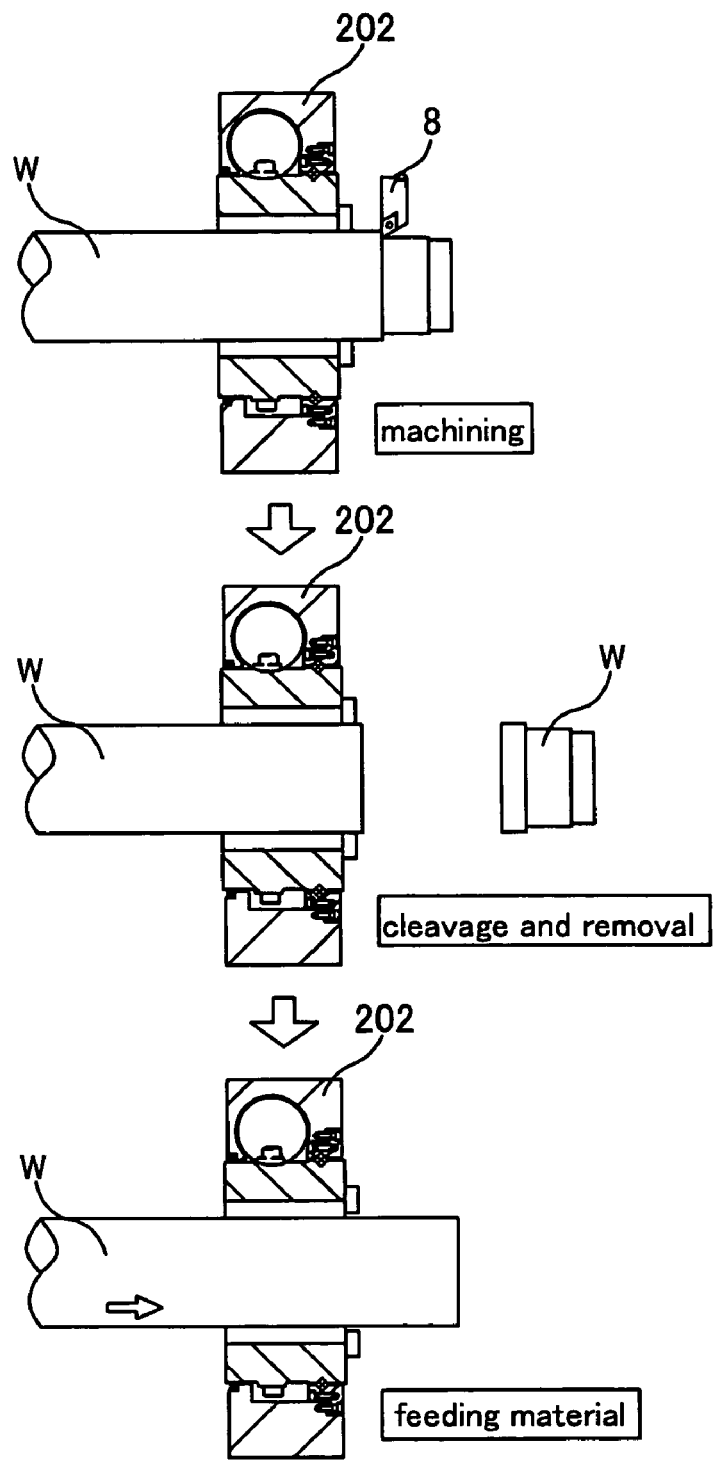
FIG. 14 is an explanatory diagram for describing the lathe spindle unit 202 etc. according to the third embodiment.
Figure 15:
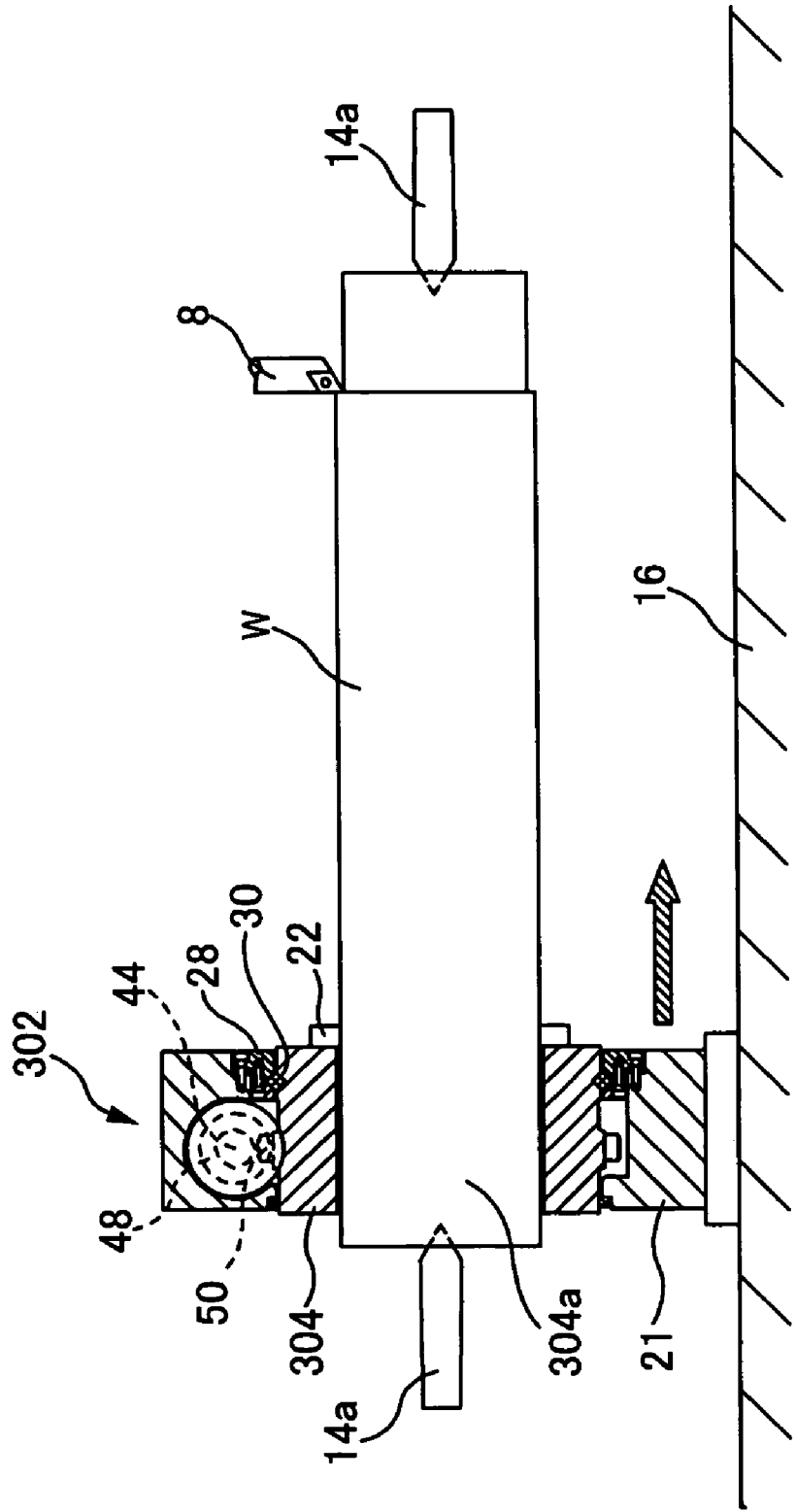
FIG. 15 is an explanatory diagram for describing a lathe spindle unit 302 etc. according to a fourth embodiment.
Figure 16:
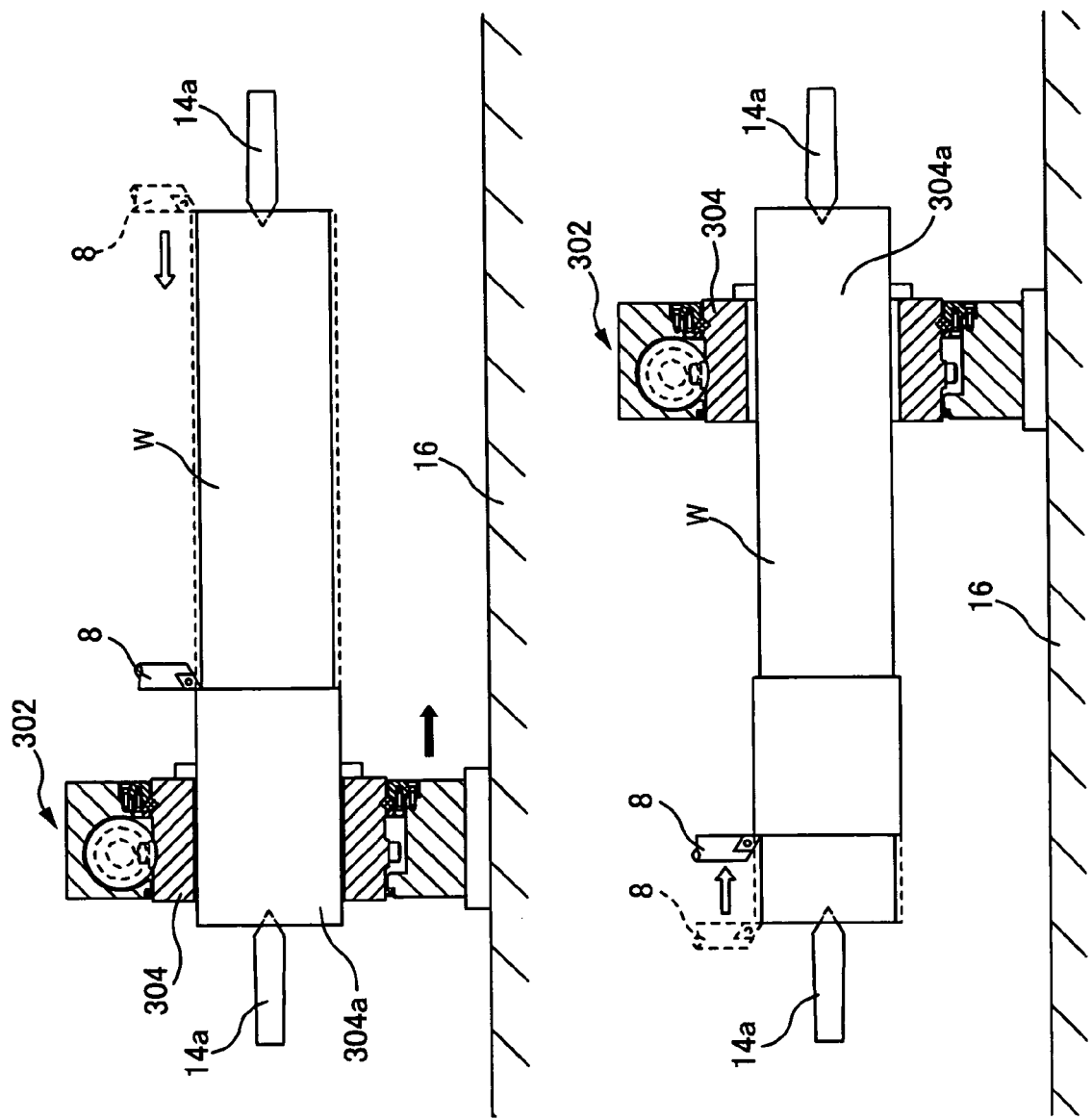
FIG. 16 is an explanatory diagram for describing the lathe spindle unit 302 etc. according to the fourth embodiment.
Figure 17:
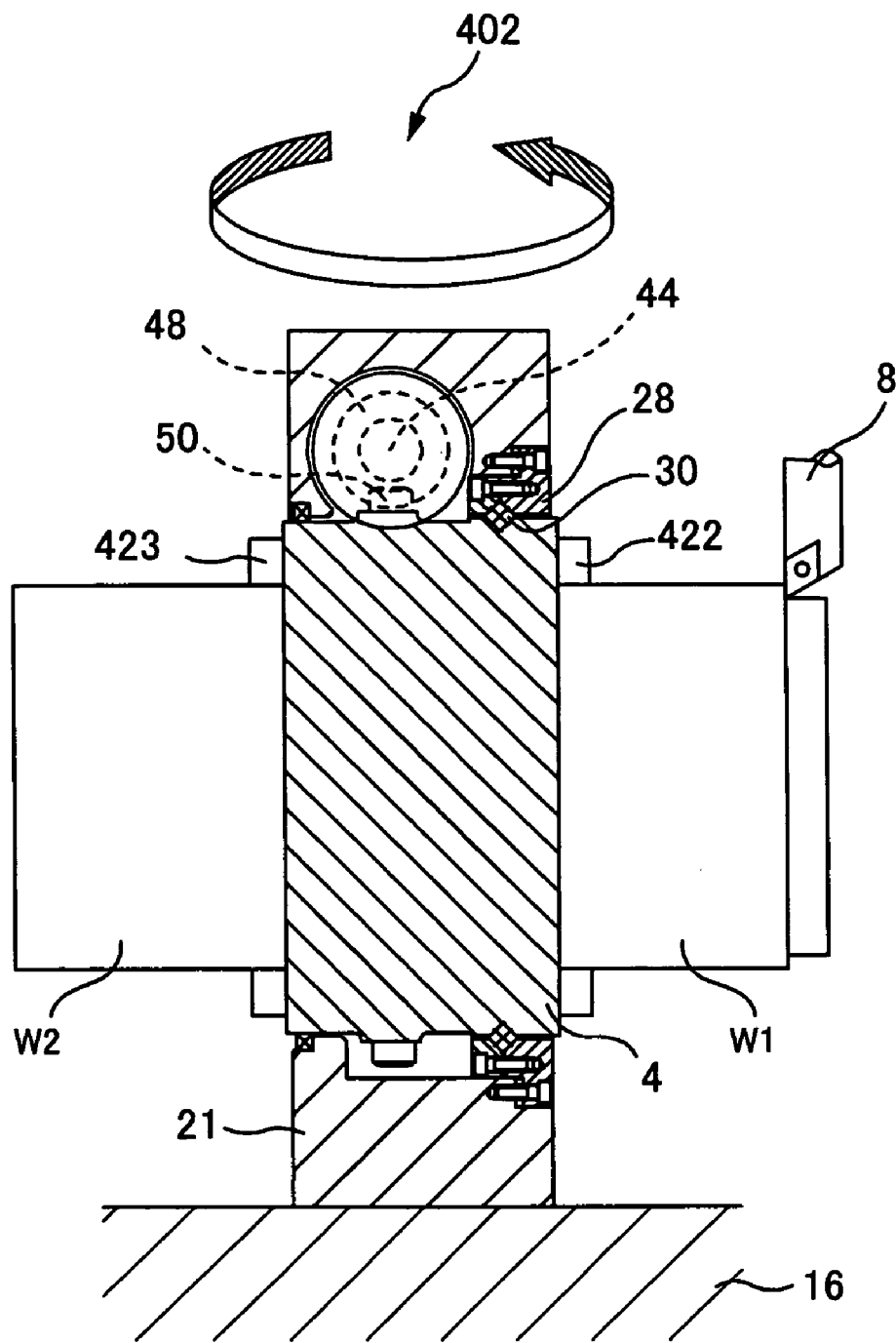
FIG. 17 is an explanatory diagram for describing a lathe spindle unit 402 etc. according to a fifth embodiment.
Figure 18:
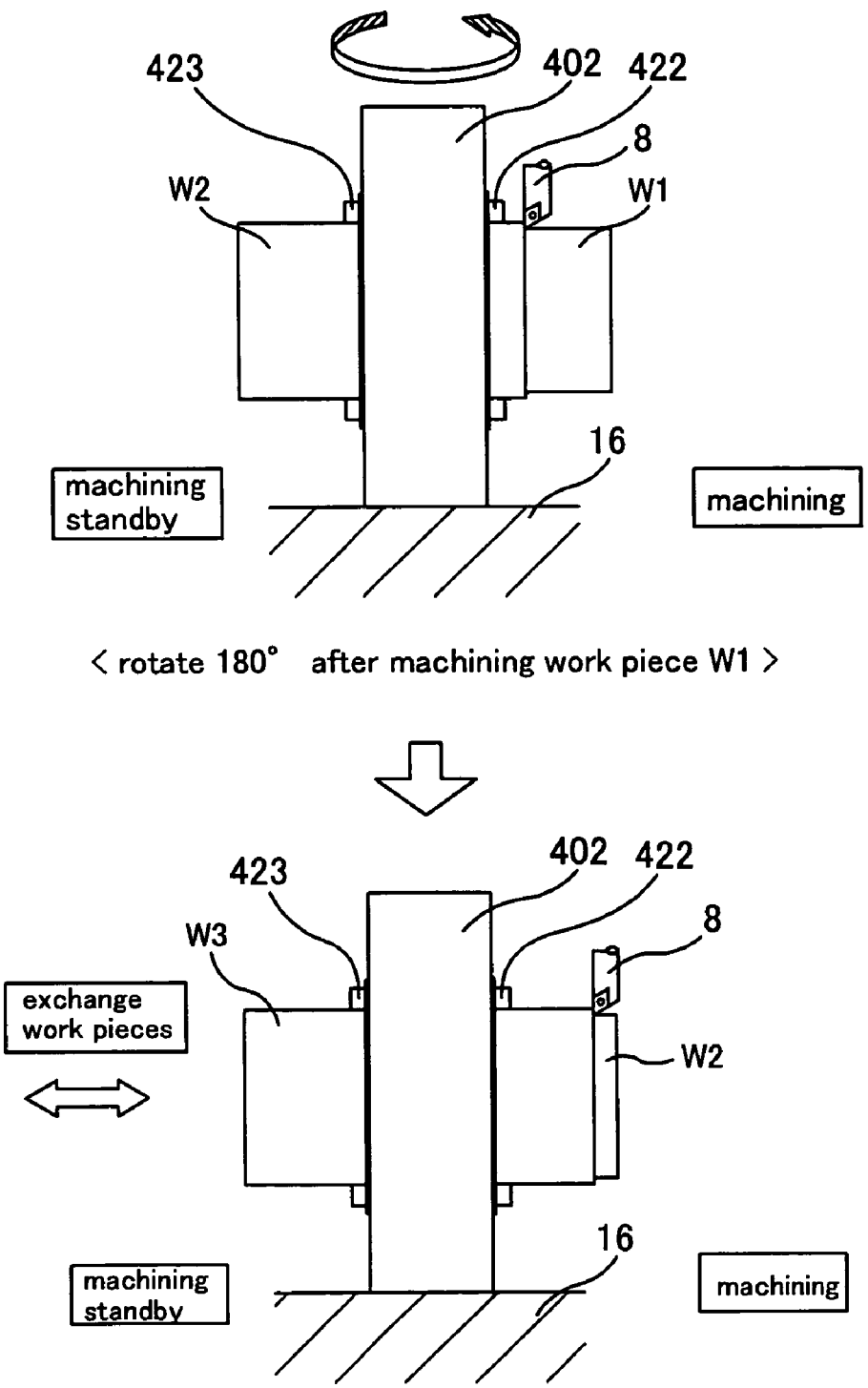
FIG. 18 is an explanatory diagram for describing the lathe spindle unit 402 etc. according to the fifth embodiment.

The other embodiments (second embodiment through fifth embodiment) are described below using FIGS. 10 to 18. FIG. 10 is an explanatory diagram for describing a lathe spindle unit 102 etc. according to a second embodiment. FIGS. 11 to 14 are explanatory diagrams for describing a lathe spindle unit 202 etc. according to a third embodiment. FIG. 15 and FIG. 16 are explanatory diagrams for describing a lathe spindle unit 302 etc. according to a fourth embodiment. FIG. 17 and FIG. 18 are explanatory diagrams for describing a lathe spindle unit 402 etc. according to a fifth embodiment.

First, the second embodiment is described using FIG. 10. In contrast to the lathe spindle unit 2 according to the first embodiment, which has the chuck 22 on only one end of the spindle 4, the lathe spindle unit 102 according to the second embodiment has chucks 122 and 123 on both ends of the spindle 4. That is, in the lathe spindle unit 102, the chucks 122 and 123 are provided on the front end and the rear end, respectively, in the rotation-axis direction of the spindle 4. This configuration can be achieved easily because the length in the rotation-axis direction of the spindle 4 is short.

In a lathe apparatus provided with the lathe spindle unit 102 having this configuration, when the spindle 4 is rotated, the work pieces W1 and W2 held by the chucks 122 and 123 are rotated along with this rotation. Tools 108 and 109 are then abutted against the work pieces W1 and W2, respectively, and cut and machine the work pieces W1 and W2. In this fashion, two work pieces W1 and W2 can be machined simultaneously, and thus it is possible to achieve a lathe spindle unit 102 with which work pieces W1 and W2 can be machined efficiently, and a lathe apparatus having that lathe spindle unit 102.

Figure 11:
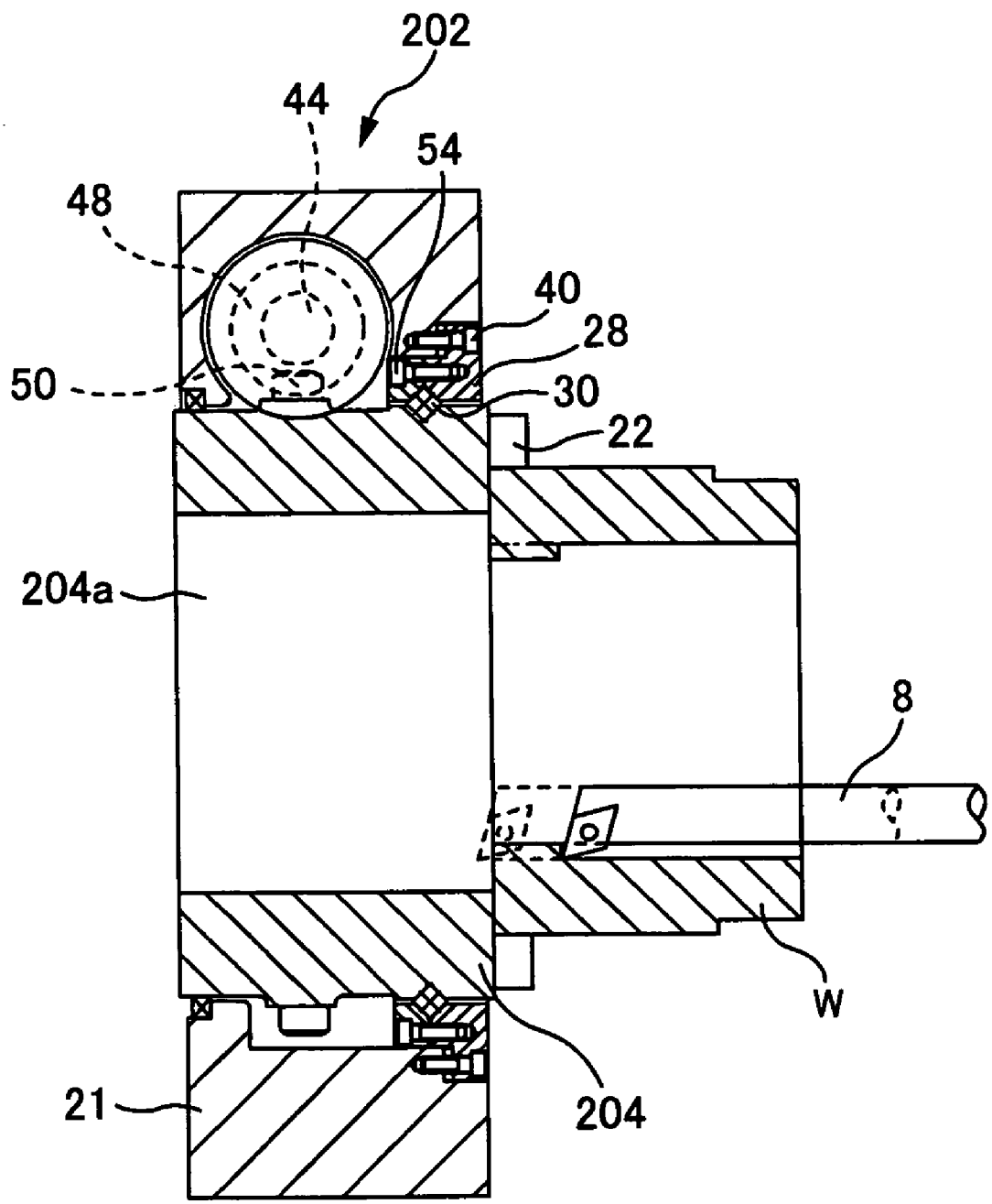
FIG. 11 is an explanatory diagram for describing a lathe spindle unit 202 etc. according to a third embodiment.

The third embodiment is described using FIGS. 11 to 14. In contrast to the lathe spindle unit 2 according to the first embodiment, which has a solid spindle 4, the lathe spindle unit 202 according to the third embodiment has a hollow spindle 204 as shown in FIG. 11. That is, in the lathe spindle unit 202, the spindle 204 has a hollow section 204a in the rotation-axis direction of the spindle 204. Because the spindle 204 is long in the radial direction, this configuration can be achieved easily.

There are the following advantages when using a lathe apparatus provided with the lathe spindle unit 202 having this configuration to machine the work piece W.

First, as shown in FIG. 11, it is possible to prevent the tool 8 from coming into contact with the spindle 204, even if the tool 8 cuts through the work piece W (the tool 8 is illustrated cutting through the work piece W by expressing the tool 8 with the dotted line in FIG. 11) when the tool is abutting against the work piece W and fed to cut and machine the work piece W. That is, the hollow section 204a has the function of preventing damage due to the spindle 204 and the tool 8 coming into contact with one another.

Figure 12:
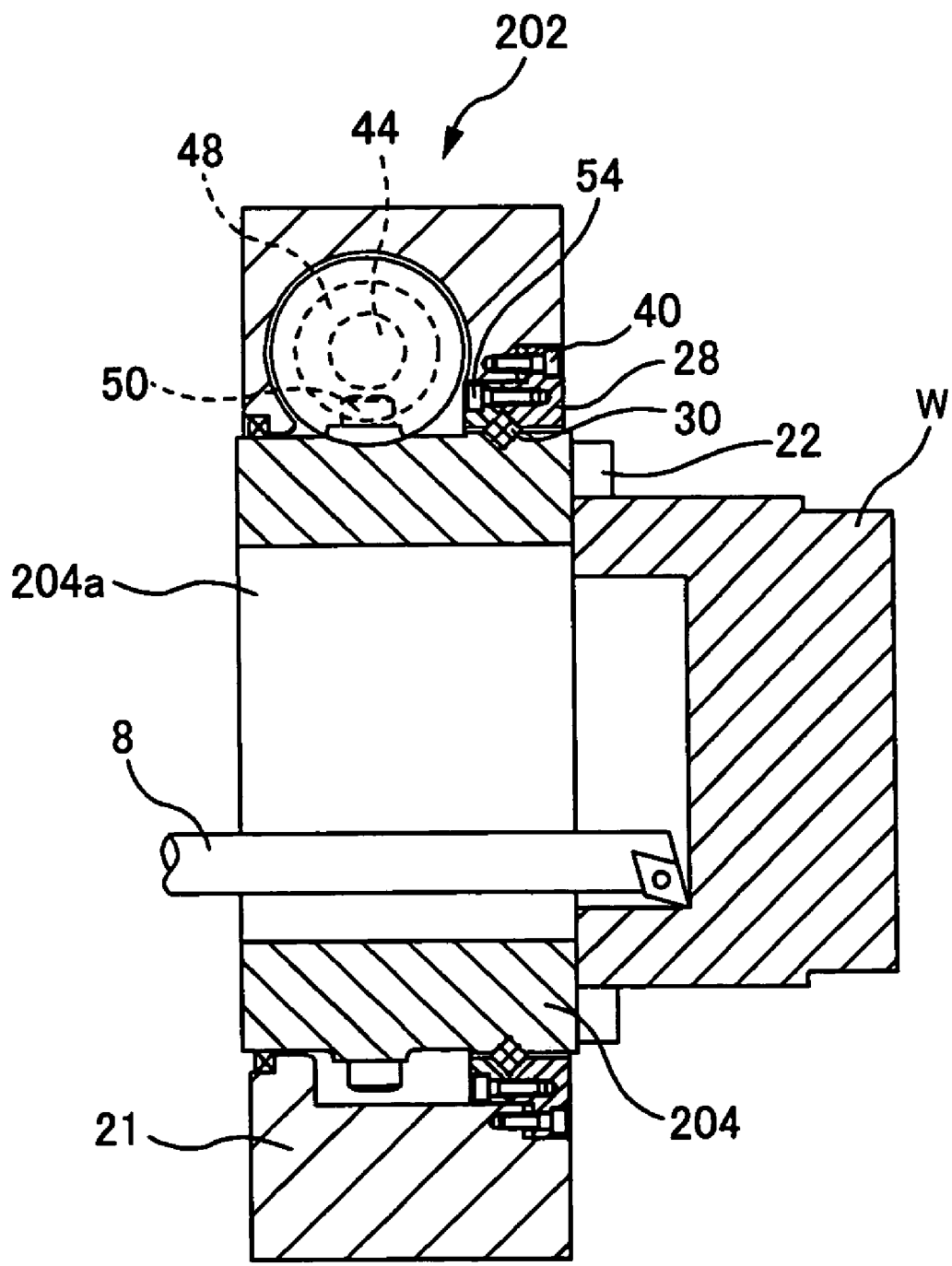
FIG. 12 is an explanatory diagram for describing the lathe spindle unit 202 etc. according to the third embodiment.

Further, as shown in FIG. 12, the work piece W being held by the chuck 22 can be processed by a tool 8 that has been passed through the hollow section 204a of the spindle 204. Therefore, there is increased flexibility in how the work piece is machined.

Figure 13:
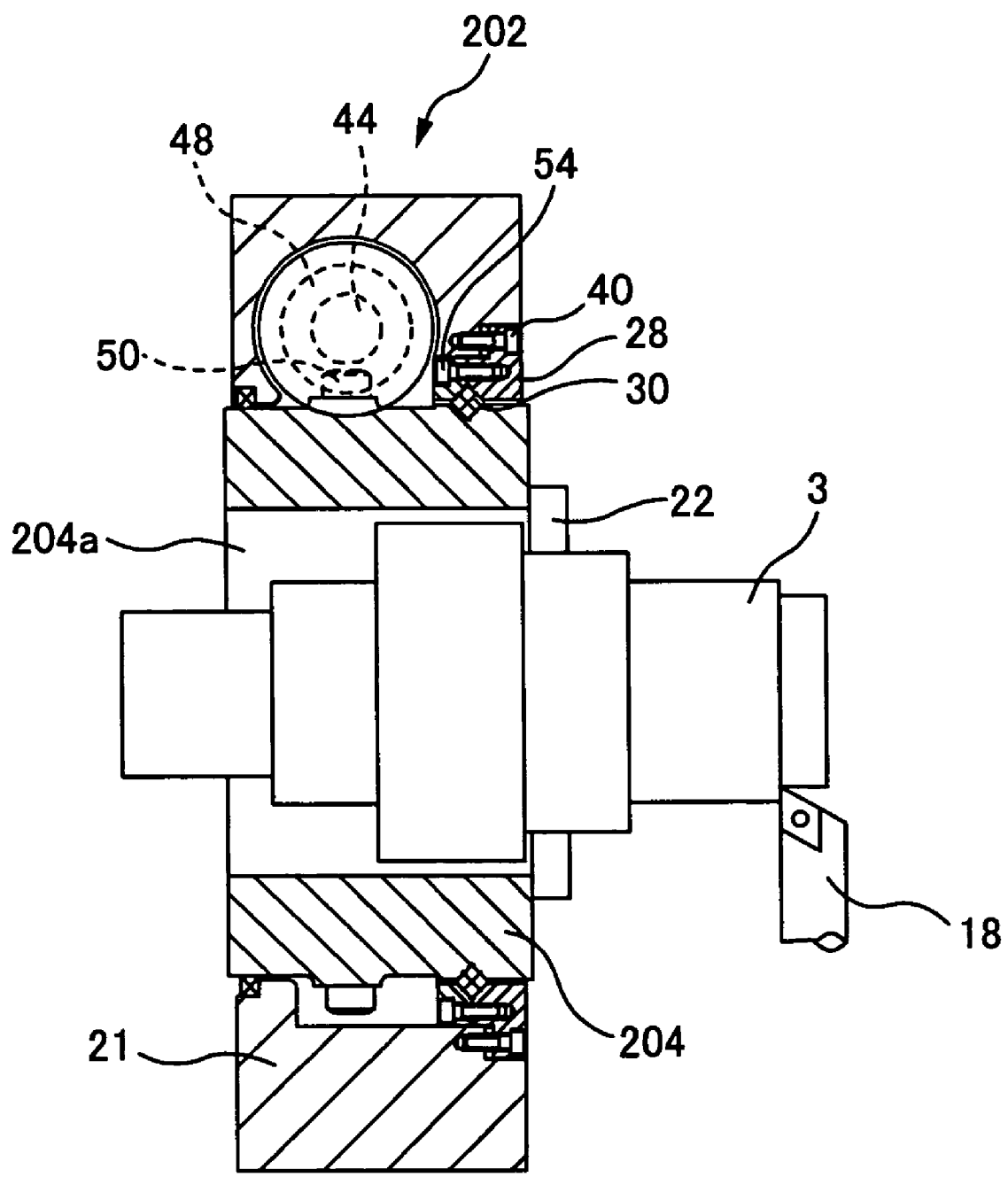
FIG. 13 is an explanatory diagram for describing the lathe spindle unit 202 etc. according to the third embodiment.

Moreover, as shown in FIG. 13, it is also possible to use the tool 8 to machine a work piece W being held by the chuck 22 in a state where the work piece W has been passed through the hollow section 204a of the spindle 204. Consequently, even long work pieces W can be suitably processed, and this allows use of the tailstock to be obviated. Also, as shown in FIG. 14, long work pieces W such as a bar can be machined by executed the procedure of machining→cleavage and removal→work piece feeding→machining→cleavage and removal→work piece feeding, and thus the number of variations on how the work piece is processed can be increased. Further, because the step of feeding the work piece is included in this procedure, it is possible to machine also the portion of the work piece W that is being held by the chuck 22 as well as the portion inside the hollow section 204a by feeding the work piece W.

The fourth embodiment is described next using FIG. 15 and FIG. 16. As shown in FIG. 15, the lathe spindle unit 302 according to the fourth embodiment is like the lathe spindle unit 202 according to the third embodiment in that the spindle 304 has a hollow section 304a, but differs from the lathe spindle unit 202 of the third embodiment in that the lathe spindle unit 302 is structured such that it is capable of moving in the rotation-axis direction of the spindle 304 with respect to the base 16 of the lathe apparatus. That is, the base 16 is provided with a drive mechanism (not shown) for moving the lathe spindle unit 302 in the rotation-axis direction of the spindle 304, and due to the action of this drive mechanism, the lathe spindle unit 302 can be moved. This drive mechanism can be achieved by a mechanism that uses ball screws, for example.

When a lathe apparatus that is provided with the lathe spindle unit 302 having this configuration is used, the work piece W can be machined as follows. The machining is described using FIG. 16.

First, the work piece W is set in the lathe apparatus. More specifically, the work piece W is held by the chuck 22 and the center 14a in a state in which it passes through the hollow section 304a.

Next, the tool 8 is abutted against an end in the longitudinal direction of the work piece W. Then, the tool 8 that is abutted against the work piece W is fed (the direction in which the tool 8 is fed is shown by the white arrow in FIG. 16) and cuts and machines the rotating work piece W (upper diagram of FIG. 16).

Then, the chuck 22 is released and the lathe spindle unit 302 is moved in the direction along the rotation-axis direction of the spindle 304 (this direction is shown by the black arrow in FIG. 16) (refer to the upper diagram of FIG. 16 and then to the lower diagram of FIG. 16). When movement of the lathe spindle unit 302 is complete, the work piece W is again held by the chuck 22.

The tool 8 is then abutted against the other end in the longitudinal direction of the work piece W and fed (the direction in which the tool 8 is fed is shown by the white arrow in the lower diagram of FIG. 16) to cut and machine the rotating work piece W (lower diagram of FIG. 16).

Using a lathe apparatus provided with the lathe spindle unit 302, which is capable of moving along the rotation-axis direction of the spindle 304 with respect to the base 16, to process the work piece W as discussed above has the following advantage. That is, like the example shown in FIG. 14, both the portion being held by the chuck 22 as well as the portion inside the hollow section 304a of the work piece W can be machined by moving the lathe spindle unit 302.

On the other hand, unlike the example shown in FIG. 14, there is no movement operation of the work piece W in the longitudinal direction. Therefore, the center of the work piece W is always maintained at a fixed position, and thus, the possibility that the problem of the machining precision deteriorating due to deteriorated concentricity, for example, will occur becomes low. For this reason, high machining precision is achieved.

The fifth embodiment is described next using FIG. 17 and FIG. 18. The lathe spindle unit 402 according to the fifth embodiment is rotatively supported by the base 16 of the lathe apparatus as shown in FIG. 17. That is, the base 16 is provided with a revolving mechanism (not shown) for turning the lathe spindle unit 402, and due to the action of this revolving mechanism, the lathe spindle unit 402 can be turned. The revolving mechanism can be achieved by a mechanism that employs gears or cams, for example.

When a lathe apparatus provided with the lathe spindle unit 402 having this configuration is used, the work piece W can be processed as follows. That is, a shown in FIG. 18, a work piece W1 and a work piece W2 can be set to the lathe apparatus and the work piece W1 can be processed first, and when machining of the work piece W1 is complete, the lathe spindle unit 402 can be turned by 180° so that the work piece W2 can be processed. In parallel to machining of the work piece W2 after the lathe spindle unit 402 has been rotated, it is also possible to exchange the work piece W1, for which machining is complete, for a new work piece W3.

As discussed above, by using a lathe apparatus that is provided with the lathe spindle unit 402, which is capable of turning with respect to the base 16, there is increased flexibility in how work pieces W are processed.

It should be noted that a lathe spindle unit 402 described above has chucks 422 and 423 on both ends of the spindle 4, but there is no limitation to this, and it is also possible to achieve a turnable lathe spindle unit that has a chuck on only one end of the spindle.

What is claimed is:

1. A lathe spindle unit comprising: a rotatable spindle having a cam follower, and a holding section for holding a work piece; a drive source for rotatively driving said spindle; a driven rotation shaft that has a cam and that is rotatively driven by said drive source, said driven rotation shaft rotatively driving said spindle using said cam and said cam follower, and a supporting section for rotatably supporting said spindle; wherein a first V-shaped groove is formed directly in said spindle along the rotation direction of said spindle, and said supporting section has a second V-shaped groove that is in opposition to said first V-shaped groove; and wherein a cross roller bearing is made by interposing, between said spindle and said supporting section, a plurality of rolling elements that roll while being in contact with said first V-shaped groove and said second V-shaped groove, and making the axis of rolling of adjacent rolling elements be perpendicular to one another.

2. A lathe spindle unit according to claim 1, wherein said cam is a globoidal cam.

3. A lathe spindle unit according to claim 2, wherein said holding section is provided at a front end and at a rear end of said spindle in the rotation-axis direction thereof.

4. A lathe spindle unit according to claim 2, wherein said spindle has a hollow section in the rotation-axis direction of said spindle.

5. A lathe apparatus comprising: a lathe spindle unit provided with a rotatable spindle having a cam follower, and a holding section for holding a work piece, a drive source for rotatively driving said spindle, and a driven rotation shaft that has a cam and that is rotatively driven by said drive source, said driven rotation shaft rotatively driving said spindle using said cam and said cam follower; a base for supporting said lathe spindle unit; and a tool for machining said work piece, wherein said lathe spindle unit is provided with a supporting section for rotatably supporting said spindle; wherein a first V-shaped groove is formed directly in said spindle along the rotation direction of said spindle, and said supporting section has a second V-shaped groove that is in opposition to said first V-shaped groove; and wherein a cross roller bearing is made by interposing, between said spindle and said supporting section, a plurality of rolling elements that roll while being in contact with said first V-shaped groove and said second V-shaped groove, and making the axis of rolling of adjacent rolling elements be perpendicular to one another.

6. A lathe apparatus according to claim 5, wherein said cam is a globoidal cam.

7. A lathe apparatus according to claim 6, wherein said holding section is provided at a front end and at a rear end of said spindle in the rotation-axis direction thereof.

8. A lathe apparatus according to claim 6, wherein said spindle has a hollow section in the rotation-axis direction of said spindle.

9. A lathe apparatus comprising: a lathe spindle unit provided with a rotatable spindle having a cam follower, and a holding section for holding a work piece, a drive source for rotatively driving said spindle, and a driven rotation shaft that has a cam and that is rotatively driven by said drive source, said driven rotation shaft rotatively driving said spindle using said cam and said cam follower; a base for supporting said lathe spindle unit; and a tool for machining said work piece, wherein said lathe spindle unit is provided with a supporting section for rotatably supporting said spindle; wherein a first V-shaped groove is formed directly in said spindle along the rotation direction of said spindle, and said supporting section has a second V-shaped groove that is in opposition to said first V-shaped groove; wherein a cross roller bearing is made by interposing, between said spindle and said supporting section, a plurality of rolling elements that roll while being in contact with said first V-shaped groove and said second V-shaped groove, and making the axis of rolling of adjacent rolling elements be perpendicular to one another, wherein said spindle has a hollow section in the rotation-axis direction of said spindle, and wherein said tool is passed through said hollow section, and said work piece being held by said holding section is machined by that tool.

10. A lathe apparatus comprising: a lathe spindle unit provided with a rotatable spindle having a cam follower, and a holding section for holding a work piece, a drive source for rotatively driving said spindle, and a driven rotation shaft that has a cam and that is rotatively driven by said drive source, said driven rotation shaft rotatively driving said spindle using said cam and said cam follower; a base for supporting said lathe spindle unit; and a tool for machining said work piece, wherein said lathe spindle unit is provided with a supporting section for rotatably supporting said spindle; wherein a first V-shaped groove is formed directly in said spindle along the rotation direction of said spindle, and said supporting section has a second V-shaped groove that is in opposition to said first V-shaped groove; wherein a cross roller bearing is made by interposing, between said spindle and said supporting section, a plurality of rolling elements that roll while being in contact with said first V-shaped groove and said second V-shaped groove, and making the axis of rolling of adjacent rolling elements be perpendicular to one another, wherein said spindle has a hollow section in the rotation-axis direction of said spindle, and wherein said work piece is held by said holding section in a manner in which said work piece passes through said hollow section, and that work piece is machined by said tool.

11. A lathe apparatus according to claim 10, wherein said lathe spindle unit is capable of moving in a direction along the rotation-axis direction of said spindle.

12. A lathe apparatus according to claim 6, wherein said base turnably supports said lathe spindle unit.

* * * * *